United States Patent
Guthrie et al.

(10) Patent No.: US 11,338,730 B2
(45) Date of Patent: May 24, 2022

(54) LIGHTING ASSEMBLY FOR AN INTERIOR OF A VEHICLE, AND VEHICLE AND INTERIOR PANEL INCLUDING THE SAME

(71) Applicant: Gulfstream Aerospace Corporation, Savannah, AZ (US)

(72) Inventors: Joe Guthrie, Savannah, GA (US); Katherine Young, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/949,002

(22) Filed: Oct. 8, 2020

(65) Prior Publication Data
US 2021/0114515 A1    Apr. 22, 2021

Related U.S. Application Data

(60) Provisional application No. 62/916,501, filed on Oct. 17, 2019.

(51) Int. Cl.
*B60Q 3/43*     (2017.01)
*B60Q 3/54*     (2017.01)
(Continued)

(52) U.S. Cl.
CPC .............. *B60Q 3/43* (2017.02); *B60Q 3/51* (2017.02); *B60Q 3/54* (2017.02); *B64D 47/02* (2013.01);
(Continued)

(58) Field of Classification Search
CPC ... B60Q 3/43; B60Q 3/46; B60Q 3/50; B60Q 3/51; B60Q 3/54; B64D 47/02;
(Continued)

(56) References Cited

U.S. PATENT DOCUMENTS 5,709,460 A * 1/1998 Lester .................. F21S 8/02
362/147
2007/0109802 A1* 5/2007 Bryan .................. B64D 11/00
362/471
(Continued)

FOREIGN PATENT DOCUMENTS

DE            20119937 U1    2/2002
DE       102015007888 A1   12/2016
(Continued)

OTHER PUBLICATIONS

Translation of DE 202018103669 U1 by Search tool; Jul. 12, 2018. (Year: 2018).*

*Primary Examiner* — Laura K Tso
(74) *Attorney, Agent, or Firm* — LKGlobal | Lorenz & Kopf, LLP

(57) ABSTRACT

Lighting assemblies for interiors of vehicles, interior panels for interiors of vehicles, and vehicles are provided herein. In one example, the lighting assembly includes a backing structure having a first backing surface configured to face the interior when the lighting assembly is mounted in the vehicle. A bezel comprises a wall that extends from an outer edge portion to an inner edge portion. The inner edge portion is spaced apart from the first backing surface to define a gap and surrounds an opening that is configured to expose at least a portion of the first backing surface to the interior. A light source is disposed between the backing structure and the bezel and is covered by the wall. The light source is operative to produce light that passes from the light source through the gap onto the first backing surface and is reflected therefrom through the opening to the interior.

18 Claims, 3 Drawing Sheets

(51) Int. Cl.
  *B64D 47/02* (2006.01)
  *F21V 21/088* (2006.01)
  *B60Q 3/51* (2017.01)
  *F21W 107/30* (2018.01)
  *F21W 106/00* (2018.01)

(52) U.S. Cl.
  CPC ....... *F21V 21/088* (2013.01); *F21W 2106/00* (2018.01); *F21W 2107/30* (2018.01)

(58) Field of Classification Search
  CPC .......... B64D 2011/0038; F21V 21/088; F21W 2107/30; F21W 2106/00
  USPC ............................ 244/118.5; 362/471, 488
  See application file for complete search history.

(56) References Cited

U.S. PATENT DOCUMENTS

| | | | |
|---|---|---|---|
| 2019/0054856 A1* | 2/2019 | Salter | B60Q 3/64 |
| 2019/0176693 A1* | 6/2019 | Park | B60Q 3/51 |
| 2019/0184895 A1 | 6/2019 | Oshina | |

FOREIGN PATENT DOCUMENTS

| | | | | |
|---|---|---|---|---|
| DE | 202018103669 U1 * | 7/2018 | ............ | B60Q 3/51 |
| DE | 202018103669 U1 | 7/2018 | | |
| EP | 2287042 A1 | 2/2011 | | |
| JP | 2011126482 A1 | 6/2011 | | |

* cited by examiner

LIGHTING ASSEMBLY FOR AN INTERIOR OF A VEHICLE, AND VEHICLE AND INTERIOR PANEL INCLUDING THE SAME

CROSS-REFERENCE TO RELATED APPLICATION

This application claims the benefit of U.S. Provisional Application No. 62/916,501, filed Oct. 17, 2019, which is incorporated herein by reference in its entirety.

TECHNICAL FIELD

The technical field relates generally to lighting assemblies for interior panels and vehicles having interior panels, and more particularly, relates to, for example, utilizing indirect light for illumination in lighting assemblies, interior panels having said light assemblies, and vehicles including said interior panels that have said lighting assemblies.

BACKGROUND

Lighting assemblies are utilized to provide illumination for an area. For example, light assemblies can be used in enclosed areas, such as interiors of buildings or vehicles, and open areas, such as for lighting roads or walkways, to enhance visibility in the surrounding vicinity. In enclosed areas like the interiors of vehicles, lighting assemblies are often utilized for the production of ambient lighting conditions so as to ensure that people in the vehicle interior can visibly see the object(s), person(s), and or environment around them.

It is common practice to utilize light-emitting diodes (LEDs) in lighting assemblies for producing light. However, looking directly at LEDs and/or other relatively intense light sources can be uncomfortable and irritating to the eyes. This is especially true in closed areas like the interiors of vehicles such as aircraft or the like. In aircraft interiors, lighting assemblies are often placed overhead on, for example, a headliner panel and/or ceiling of the aircraft interior. Because of limited space in aircraft interiors, these lighting assemblies are usually disposed in the passengers' and crew's line of sight. As such, these directly visible light sources can be unsightly and uncomfortable for passenger(s) and/or other occupants(s).

Accordingly, it is desirable to provide a lighting assembly for an interior of a vehicle, and an interior panel and a vehicle that includes a lighting assembly that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a lighting assembly for an interior of a vehicle, an interior panel for an interior of a vehicle, and a vehicle are provided herein.

In a first non-limiting embodiment, the lighting assembly includes, but is not limited to, a backing structure having a first backing surface configured such that the first backing surface faces towards the interior when the lighting assembly is mounted in the vehicle. The lighting assembly further includes, but is not limited to, a bezel including a wall that extends from a wall outer edge portion to a wall inner edge portion. The wall inner edge portion is spaced apart from the first backing surface to define a gap and surrounds an opening that is configured to expose at least a portion of the first backing surface to the interior. The lighting assembly further includes, but is not limited to, a light source disposed between the backing structure and the bezel and covered by the wall. The light source is operative to produce light that passes from the light source through the gap onto the first backing surface and is reflected therefrom through the opening to the interior.

In another non-limiting embodiment, the interior panel includes, but is not limited to, an interior panel section having a first panel surface configured such that the first panel surface faces towards the interior when the interior panel is mounted in the vehicle and a second panel surface disposed opposite the first panel surface. The interior panel section has a panel opening formed therethrough. The interior panel further includes, but is not limited to, a lighting assembly coupled to the interior panel section about the panel opening. The lighting assembly includes a backing structure extending over the panel opening. The backing structure has a first backing surface facing towards the panel opening. The lighting assembly includes a bezel. The bezel includes a wall that is disposed in the panel opening and that extends from a wall outer edge portion to a wall inner edge portion. The wall inner edge portion is spaced apart from the first backing surface to define a gap and surrounds an opening that is configured to expose at least a portion of the first backing surface to the interior. The lighting assembly includes a light source disposed between the backing structure and the bezel and covered by the wall. The light source is operative to produce light that passes from the light source through the gap onto the first backing surface and is reflected therefrom through the opening to the interior.

In another non-limiting embodiment, the vehicle includes, but is not limited to, a vehicle structure having an interior. The vehicle further includes, but is not limited to, and interior panel disposed in the interior. The interior panel includes an interior panel section having a first panel surface facing towards the interior and a second panel surface disposed opposite the first panel surface. The interior panel section has a panel opening formed therethrough. The interior panel includes a lighting assembly coupled to the interior panel section about the panel opening. The lighting assembly includes a backing structure extending over the panel opening. The backing structure has a first backing surface facing towards the panel opening. The lighting assembly includes a bezel. The bezel includes a wall that is disposed in the panel opening and that extends from a wall outer edge portion to a wall inner edge portion. The wall inner edge portion is spaced apart from the first backing surface to define a gap and surrounds an opening that exposes at least a portion of the first backing surface to the interior. The lighting assembly includes a light source disposed between the backing structure and the bezel and covered by the wall. The light source is operative to produce light that passes from the light source through the gap onto the first backing surface and is reflected therefrom through the opening to the interior.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
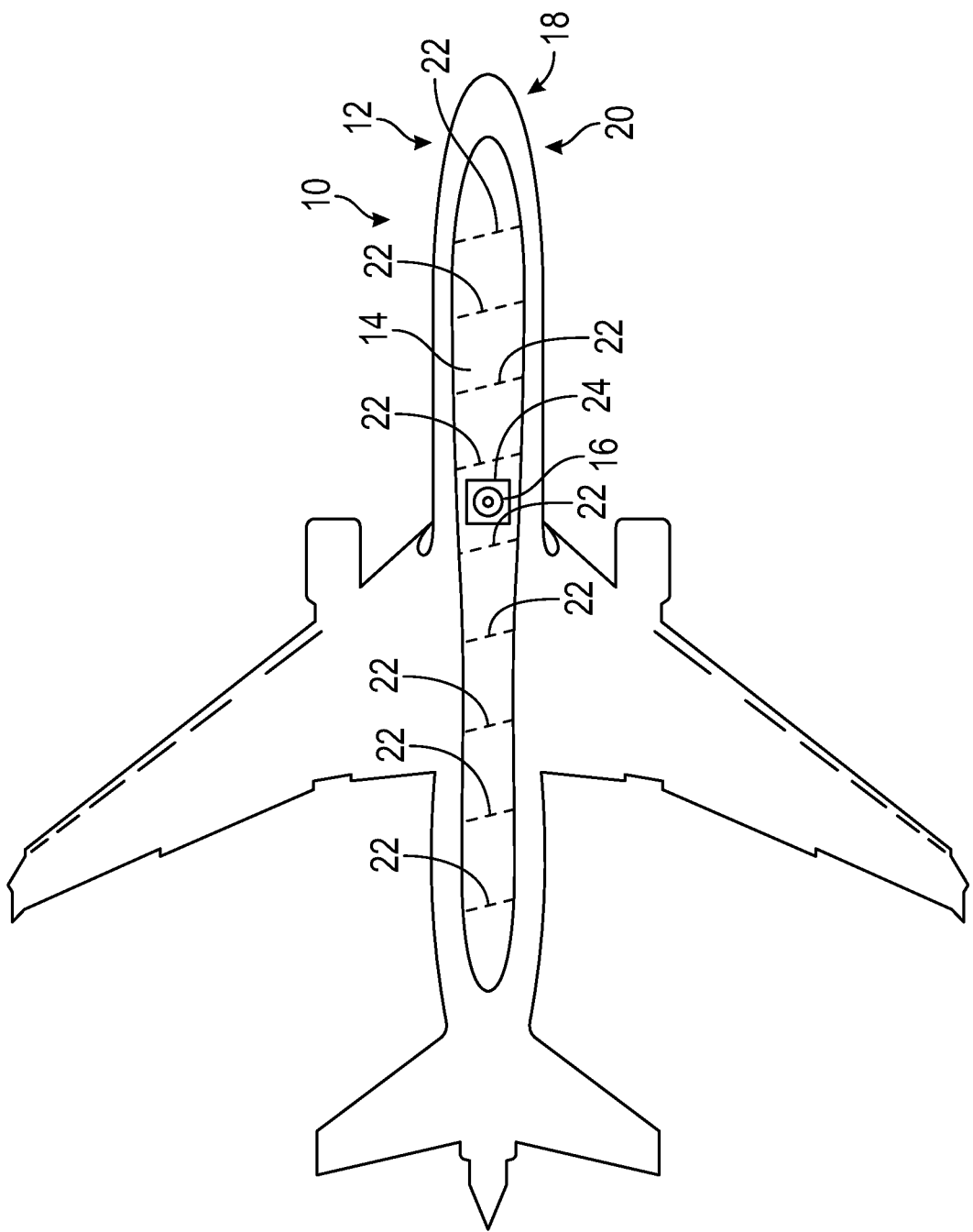
FIG. 1 illustrates a top view of a vehicle including lighting assemblies in accordance with an exemplary embodiment

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to a lighting assembly for an interior of a vehicle, an interior panel for an interior of a vehicle, and a vehicle. The exemplary embodiments taught herein provide a vehicle that includes a vehicle structure having an interior. In an exemplary embodiment, the vehicle is an aircraft and the vehicle structure is an aircraft structure, such as, for example, a fuselage. The vehicle further includes an interior panel that is disposed in the interior. In an exemplary embodiment, the interior panel is a headliner panel that is disposed in an upper area of the interior. The interior panel, for example, forms at least a part of a ceiling, roof, and/or overhead surface or covering.

The interior panel includes an interior panel section having a first panel surface facing towards the interior and a second panel surface disposed opposite the first panel surface. The interior panel section has a panel opening formed therethrough and includes a lighting assembly that is coupled to the interior panel section about the panel opening.

The lighting assembly includes a backing structure disposed proximate to the second panel surface and extending over the panel opening. The backing structure has a first backing surface facing towards the panel opening.

The lighting assembly further includes a bezel that is disposed proximate to the second panel surface. The interior panel section is disposed between the bezel and the backing structure. The bezel includes a wall that is disposed in the panel opening and that extends from a wall outer edge portion to a wall inner edge portion. In an exemplary embodiment, the wall outer edge portion extends towards the first backing surface to the wall inner edge portion. The wall inner edge portion is spaced apart from the first backing surface to define a gap and surrounds an opening that exposes at least a portion of the first backing surface to the interior.

The lighting assembly includes a light source disposed between the backing structure and the bezel and covered by the wall. In an exemplary embodiment, the light source is recessed relative to the wall inner edge portion. The light source is operative to produce light that passes from the light source through the gap onto the first backing surface and is reflected therefrom through the opening to the interior.

In an exemplary embodiment, advantageously covering the light source with the wall and arranging it between the backing structure and the bezel produces light that passes from the light source through the gap onto the first backing surface and is reflected therefrom through the opening into the interior as indirect light. This produces ample light in, for example, an aircraft interior for passenger(s) and/or crew member(s) to see clearly without the discomfort and irritation that may otherwise result from lighting assemblies utilizing light sources that are directly visible to the passenger(s) and/or other occupant(s).

FIG. 1 illustrates a top view of a vehicle 10 including lighting assemblies 16 in accordance with an exemplary embodiment. In an exemplary embodiment, the vehicle 10 is an aircraft 12. Although the vehicle 10 is illustrated as an aircraft 12, it is to be understood that various alternate embodiments may include the vehicle 10 configured as an automobile, a motor vehicle, and/or the like.

The vehicle 10 includes a vehicle structure 18 that has an interior 14. In an exemplary embodiment, the vehicle structure 18 is an aircraft structure 20. The interior 14 includes an upper area (illustrated by dashed lines 22). In an exemplary embodiment, the upper area 22 includes at least one interior panel 24 that forms at least a part of a ceiling, a roof, a headliner structure, and/or the like. In an exemplary embodiment, the interior panel is a headliner panel that is disposed in the upper area 22 of the interior 14.

In an exemplary embodiment, the interior panel 24 includes at least one lighting assembly 16. As illustrated, the lighting assemblies 16 are disposed in the upper area 22 of the vehicle 10. Although the lighting assemblies 16 are illustrated as being disposed in the upper area 22 of the vehicle 10, it is to be understood that various alternate embodiments may include the lighting assemblies 16 as being disposed in and/or on another surface or structure in the interior 14, for example, in which the interior panel 24 forms at least part of a wall, a floor, a bulkhead, a separating panel, an overhead surface, and/or the like. Further, although the vehicle 10 is illustrated as having a singular lighting assembly 16, it is to be understood that various alternate embodiments of the vehicle 10 include the vehicle 10 having more than one lighting assembly 16.

Figure 2:
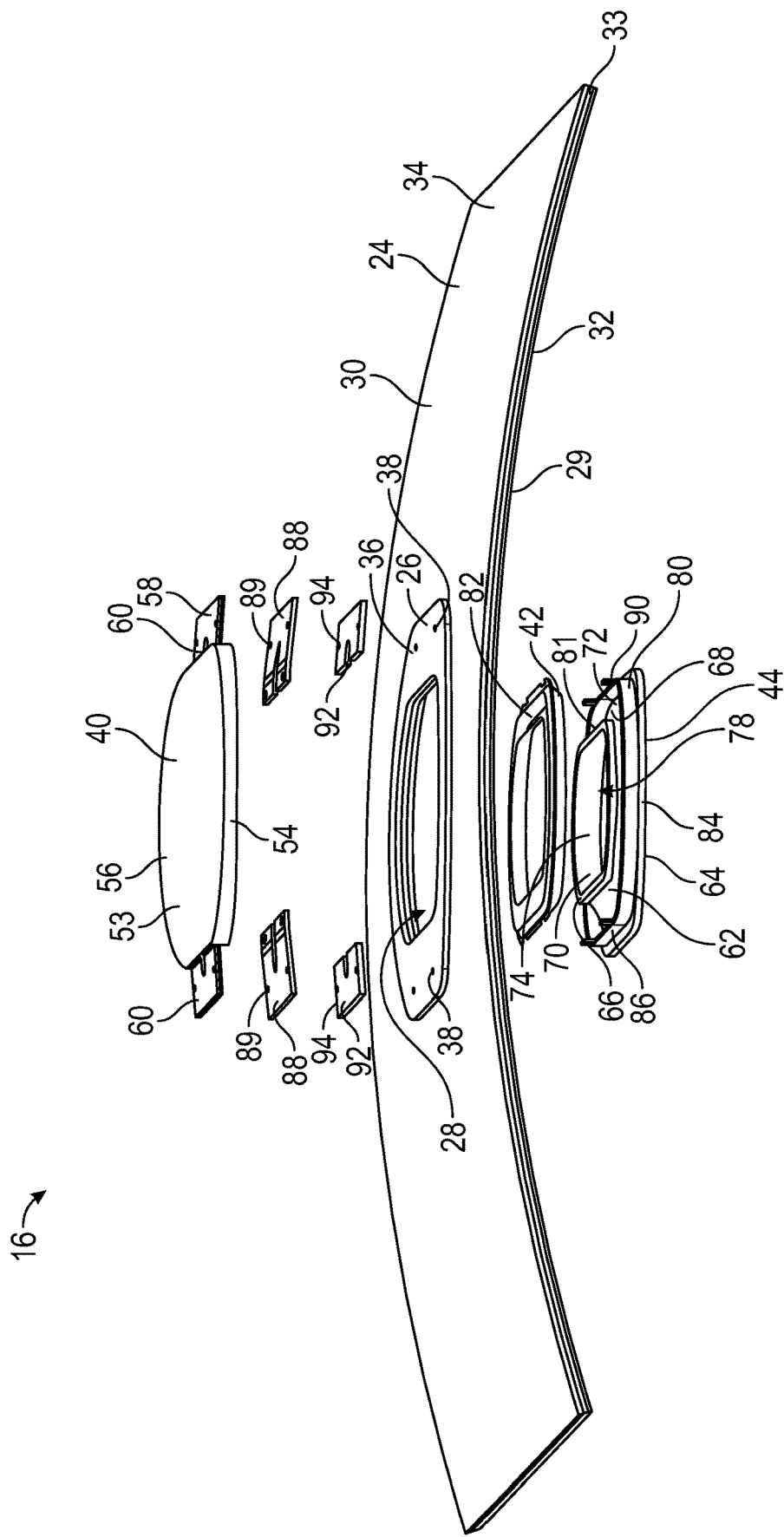
FIG. 2 illustrates an exploded view of an interior panel for an interior of a vehicle and including a lighting assembly in accordance with an exemplary embodiment.
Figure 3:
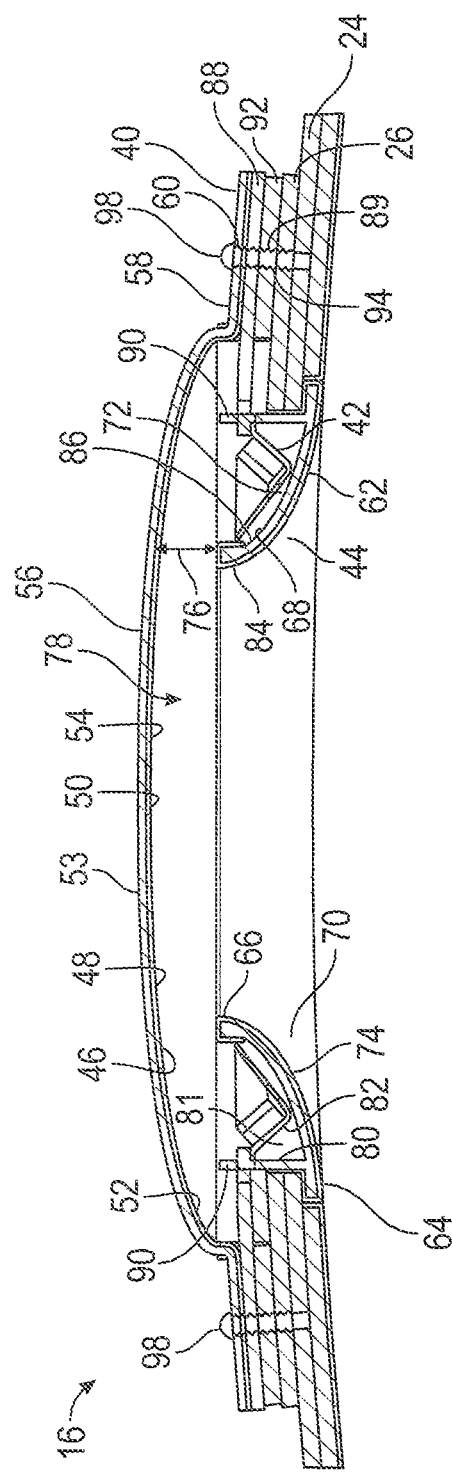
FIG. 3 illustrates a cross-sectional side view of a lighting assembly for an interior of a vehicle in accordance with an exemplary embodiment.

Referring also to FIGS. 2 and 3, in an exemplary embodiment, the interior panel 24 includes an interior panel section 26 and has an panel surface 29 that faces towards the interior 14 and an panel surface 30 disposed opposite the panel surface 29. In an exemplary embodiment, the interior panel section 26 has a panel opening 28 formed therethrough. The lighting assembly 16 is coupled to the interior panel section 26 about the panel opening 28. In an exemplary embodiment, the interior panel 24 includes a decorative layer 32, such as, for example, a fabric or textile layer, leather, a synthetic leather, or the like and includes the panel surface 29. In an exemplary embodiment, the interior panel 24 includes a honeycomb structure 34 such as a Nextel® honeycomb structure and may include a nylon fiber material, an aramid fiber material, a fiberglass material, or the like. The interior panel 24 may include a high-density foam 33 disposed between the decorative layer 32 and the honeycomb structure 34. In an exemplary embodiment, the interior panel section 26 includes a localized thickened area 36 (e.g., localized additional honeycomb structure) about the panel opening 28 overlying the honeycomb structure 34 to enhance fastening or otherwise securing the lighting assembly 16 to the interior panel 24. As illustrated and will be discussed in further detail below, the localized thickened area 36 of the interior panel section 26 has holes 38 that are spaced apart from the panel opening 28 and that receive threaded fasteners 98 for fastening or otherwise securing the lighting assembly 16 to the interior panel 24.

In an exemplary embodiment, the lighting assembly 16 includes a backing structure 40, a lighting tray 42 that includes a light source(s) 41, and a bezel 44. The backing structure 40 is disposed adjacent to the panel surface 30 and extends over the panel opening 28. The backing structure 40 is configured such that the backing structure 40 faces towards the interior 14 when the lighting assembly 16 is mounted in the vehicle 10. As illustrated, the backing structure 40 has a backing surface 46 that faces towards the panel opening 28 and towards the interior 14 when the lighting assembly 16 is mounted in the interior 14 of the vehicle 10. In an exemplary embodiment, the backing surface 46 is configured as or otherwise has a concave surface 48 that includes a backing surface portion 50. The backing surface portion 50 is exposed (e.g., direct line of sight) to the interior 14 and a backing surface portion 52 surrounds the backing surface portion 50. In an exemplary embodiment, the backing surface portion 52 is hidden (e.g., not in a direct line of sight) from the interior 14. The backing structure 40 further includes a backing surface 53 that is disposed opposite the backing surface 46.

In an exemplary embodiment, the backing structure 40 includes a decorative covering 54 such as a fabric or textile layer, leather, a synthetic leather, or the like and includes the backing surface 46. As illustrated, the backing structure 40 further includes a substrate 56 that is, for example, formed of a relatively rigid material such as a polymeric material, a plastic material, a composite material, or the like and includes the backing surface 53. The decorative covering 54 overlays or is otherwise supported by the substrate 56.

Extending laterally outward in opposing directions, the backing structure 40 includes tabs 58. The tabs 58 have holes 60 formed therethrough that receive, for example, threaded fasteners 98 (shown in FIG. 3) that secure the backing structure 40 to the interior panel section 26.

At least a portion of the bezel 44 is disposed adjacent to at least a portion of the backing structure 40 and the bezel 44 includes a wall 62 that extends from a wall outer edge portion 64 to a wall inner edge portion 66. The wall 62 of the bezel 44 includes a bezel wall surface 68 that faces towards the backing structure 40 and a bezel wall surface 70 that is opposite the bezel wall surface 68. As illustrated, the bezel wall surface 70 is exposed (e.g., direct line of sight) to the interior 14. In an exemplary embodiment, the wall 62 extends from the wall outer edge portion 64 inwardly and generally towards the backing surface 46 to the wall inner edge portion 66 such that the bezel wall surface 68 includes a concave wall surface section 72 and the bezel wall surface 70 includes a convex wall surface section 74. As such, the backing surface portion 52 is substantially covered by the wall 62 of the bezel 44 and the backing surface portion 52 is hidden (e.g., not in direct line of sight) from the interior 14.

The wall inner edge portion 66 is adjacent to and spaced apart from the backing surface 46 to define a gap 76. In an exemplary embodiment, the wall inner edge portion 66 surrounds an opening 78 that is exposed (e.g., direct line of sight) to the interior 14. The opening 78 is sized or otherwise configured to expose at least a portion of the backing surface 46 to the interior 14. In an exemplary embodiment, the opening 78 exposes the backing surface portion 50 to the interior 14 so that, for example, the backing surface portion 50 is in a direct line of sight to the interior 14. In an exemplary embodiment, the opening 78 is completely or substantially open and does not have a lens or other covering, whether transparent, translucent, or otherwise, arranged therein.

In an exemplary embodiment, the bezel 44 includes a decorative covering 84 such as a fabric or textile layer, leather, a synthetic leather, or the like and that includes the bezel wall surface 70. The bezel 44 further includes a substrate 86 that is, for example, formed of a relatively rigid material such as a polymeric material, a plastic material, a composite material, or the like. As illustrated, the bezel 44 includes tabs 90 extending upwardly from the upper edge of the wall 62 to secure the bezel 44 to the interior panel section 26 as will be discussed in further detail below.

The lighting assembly 16 includes one or more light sources 41. In an exemplary embodiment, the light source(s) 41 is disposed in the lighting tray 42. As illustrated, the light source(s) 41 is disposed between the backing structure 40 and the bezel 44 and is covered by the wall 62 so that the light source(s) 41 is not exposed or in a direct line of sight to the interior 14. In particular, the light source(s) 41 is disposed adjacent to the bezel wall surface 68 between the wall outer edge portion 64 and the wall inner edge portion 66. The bezel 44 has a flange 80 that is disposed between the wall outer edge portion 64 and the wall inner edge portion 66. The flange 80 extends from the wall 62 towards the backing structure 40 to define a channel 81 between the flange 80 and a section of the wall 62 that includes the wall inner edge portion 66. In an exemplary embodiment, the light source(s) 41 is disposed in the channel 81 recessed relative to (e.g., below) the wall inner edge portion 66. In an exemplary embodiment, the light source(s) 41 is operative to produce light that passes from the light source(s) 41 through the gap 76 onto the backing surface 46 and is reflected therefrom through the opening 78 to the interior 14 to provide indirect lighting to the interior 14. In an exemplary embodiment, the light source(s) 41 is disposed on a circuit board and is a light-emitting diode(s) (LED(s)).

In an exemplary embodiment, the lighting tray 42 is disposed between the bezel 44 and the backing structure 40 and carries the light source(s) 41, for example, a plurality of light sources 41 which may be configured in an LED array or the like. In an exemplary embodiment, the lighting tray 42 is disposed in the channel 81 recessed relative to (e.g., below) the wall inner edge portion 66. As illustrated, the lighting tray 42 includes an lighting tray wall 82 and the light sources 41 are disposed adjacent to the lighting tray wall 82.

In an exemplary embodiment, the lighting assembly 16 further includes one or more clips 88. The clip(s) 88 is disposed between the interior panel 24 and the backing structure 40. In an exemplary embodiment, the tab(s) 90 from the bezel 44 extends to and is engaged or otherwise received by the clip(s) 88 to secure the bezel 44 to the interior panel section 26. In an exemplary embodiment, advantageously this allows the bezel 44 and the lighting tray 42 to be easily disassembled from the interior panel 24 for maintenance of the light source 42 and/or the lighting assembly 16. In an exemplary embodiment, the clip(s) 88 includes hole(s) 89 that receive, for example, the threaded fasteners 98 to secure the clip(s) 88 to the interior panel section 26.

In an exemplary embodiment, the lighting assembly 16 further includes spacers 92 that are disposed between the interior panel 24 and the backing structure 40, such as between the clip(s) 88 and the backing structure 40. As illustrated, the spacers 92 have holes 94 that receive, for example, the threaded fasteners 98 to secure the spacers 92 to the interior panel section 26.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A lighting assembly for an interior panel of a vehicle having a panel opening formed therethrough, the lighting assembly comprising:
a backing structure comprising a substrate and a decorative covering that overlays and is secured to the substrate and that includes a first backing surface, wherein the first backing surface of the backing structure includes a concave surface, and wherein the backing structure is configured such that the backing structure extends over the panel opening of the interior panel and the first backing surface faces towards the interior when the lighting assembly is mounted in the vehicle;
a bezel comprising a wall that extends from a wall outer edge portion to a wall inner edge portion, wherein the wall inner edge portion is spaced apart from the first backing surface to define a gap and extends around a central opening that is configured to expose at least a portion of the first backing surface to the interior; and
a light source disposed between the backing structure and the bezel and covered by the wall, wherein the light source is operative to produce light that passes from the light source through the gap onto the first backing surface and is reflected therefrom through the central opening to the interior.

2. The lighting assembly of claim 1, wherein the wall of the bezel has a first bezel wall surface facing towards the backing structure and a second bezel wall surface that is opposite the first bezel wall surface, and wherein the wall extends from the wall outer edge portion inwardly and generally towards the first backing surface to the wall inner edge portion such that the first bezel wall surface includes a concave wall surface section and the second bezel wall surface includes a convex wall surface section.

3. The lighting assembly of claim 2, wherein the light source is disposed adjacent to the first bezel wall surface between the wall outer edge portion and the wall inner edge portion.

4. The lighting assembly of claim 1, wherein the first backing surface includes a first backing surface portion that is configured to be exposed to the interior and a second backing surface portion that surrounds the first backing surface portion and that is substantially covered by the wall of the bezel, and wherein the first backing surface portion is in a direct line of sight to the light source.

5. The lighting assembly of claim 1, further comprising a lighting tray disposed between the bezel and the backing structure, and wherein the lighting tray carries the light source and at least one additional light source.

6. The lighting assembly of claim 5, wherein the lighting tray includes a lighting tray wall, and wherein the light source and the at least one additional light source are disposed adjacent to the lighting tray wall.

7. The lighting assembly of claim 6, wherein the bezel has a flange that is disposed between the wall outer edge portion and the wall inner edge portion and that extends from the wall towards the backing structure to define a channel between the flange and a section of the wall that includes the wall inner edge portion, and wherein the lighting tray is disposed in the channel recessed relative to the wall inner edge portion.

8. An interior panel for an interior of a vehicle, the interior panel comprising:
an interior panel section having a first panel surface configured such that the first panel surface faces towards the interior when the interior panel is mounted in the vehicle and a second panel surface disposed opposite the first panel surface, and wherein the interior panel section has a panel opening formed therethrough; and
a lighting assembly coupled to the interior panel section about the panel opening and comprising:
a backing structure extending over the panel opening, wherein the backing structure comprises a substrate and a decorative covering that overlays and is secured the substrate and that includes a first backing surface facing towards the panel opening wherein the first backing surface of the backing structure includes a concave surface, and wherein the first backing surface faces towards the interior when the lighting assembly is mounted in the vehicle;
a bezel, wherein the bezel comprises a wall that is disposed in the panel opening and that extends from a wall outer edge portion to a wall inner edge portion, wherein the wall inner edge portion is spaced apart from the first backing surface to define a gap and extends around a central opening that is configured to expose at least a portion of the first backing surface to the interior; and
a light source disposed between the backing structure and the bezel and covered by the wall, wherein the light source is operative to produce light that passes from the light source through the gap onto the first backing surface and is reflected therefrom through the central opening to the interior.

9. The interior panel of claim 8, further comprising a clip disposed between the backing structure and the second panel surface of the interior panel section, and wherein the bezel includes a tab that extends to and is received by the clip to secure the bezel to the interior panel section.

10. The interior panel of claim 9, further comprising a fastening element that attaches the clip to the interior panel section.

11. The interior panel of claim 10, wherein the fastening element further attaches the backing structure to the interior panel section.

12. The interior panel of claim 11, further comprising a spacer disposed between the clip and the second panel surface of the interior panel section, and wherein the fastening element further attaches the spacer to the interior panel section.

13. The interior panel of claim 8, wherein the lighting assembly further comprises a lighting tray disposed between the bezel and the backing structure, and wherein the lighting tray carries the light source and at least one additional light source.

14. The interior panel of claim 13, wherein the lighting tray includes a lighting tray wall, and wherein the light source and the at least one additional light source are disposed adjacent to the lighting tray wall.

15. The interior panel of claim 14, wherein the bezel has a flange that is disposed between the wall outer edge portion and the wall inner edge portion and that extends from the wall towards the backing structure to define a channel between the flange and a section of the wall that includes the wall inner edge portion, and wherein the lighting tray is disposed in the channel recessed relative to the wall inner edge portion.

16. A vehicle comprising:
a vehicle structure having an interior; and an interior panel according to claim 8 disposed in the interior.

17. The vehicle of claim 16, wherein the vehicle is an aircraft and the vehicle structure is an aircraft structure.

18. The vehicle of claim 16, wherein the interior panel is a headliner panel that is disposed in an upper area of the interior.

\* \* \* \* \*